US012608502B2

(12) United States Patent　　　　(10) Patent No.:　US 12,608,502 B2
　　　 Han　　　　　　　　　　　　　(45) Date of Patent:　　Apr. 21, 2026

(54) QUERY INFORMATION PROCESSING METHOD USING FULLY HOMOMORPHIC ENCRYPTED DATABASE WITH FIELD EXPANSION AND COMPUTING DEVICE FOR PERFORMING THE SAME

(71) Applicant: Supergate Co., Ltd., Seoul (KR)

(72) Inventor: Seung Min Han, Seoul (KR)

(73) Assignee: Supergate Co., Ltd., Seoul (KR)

( * ) Notice: Subject to any disclaimer, the term of this patent is extended or adjusted under 35 U.S.C. 154(b) by 96 days.

(21) Appl. No.: 18/821,048

(22) Filed: Aug. 30, 2024

(65) Prior Publication Data

US 2025/0077701 A1　　Mar. 6, 2025

(30) Foreign Application Priority Data

Aug. 31, 2023　　(KR) ......................... 10-2023-0115051

(51) Int. Cl.
　　*G06F 21/00*　　　　(2013.01)
　　*G06F 16/28*　　　　(2019.01)
　　*G06F 21/62*　　　　(2013.01)
　　*H04L 9/00*　　　　(2022.01)
(52) U.S. Cl.
　　CPC ........ *G06F 21/6227* (2013.01); *G06F 16/285* (2019.01); *H04L 9/008* (2013.01)
(58) Field of Classification Search
　　None
　　See application file for complete search history.

(56)　　　　　References Cited

U.S. PATENT DOCUMENTS

| | | | | |
|---|---|---|---|---|
| 9,361,479 B2 * | 6/2016 | Lesavich | ................... | G09C 5/00 |
| 9,608,817 B2 * | 3/2017 | Gentry | ....................... | H04L 9/38 |
| 10,038,562 B2 * | 7/2018 | Gajek | .................... | H04L 9/3093 |
| 10,489,604 B2 * | 11/2019 | Yoshino | .............. | G06F 21/6227 |
| 10,778,409 B2 * | 9/2020 | Cheon | .................. | H04L 9/3093 |
| 10,812,252 B2 * | 10/2020 | Laine | .................. | G06F 9/30014 |
| 11,601,258 B2 * | 3/2023 | Carr | ....................... | H04L 9/008 |
| 2021/0357521 A1 | 11/2021 | Trepetin et al. | | |
| 2022/0116200 A1 | 4/2022 | Carr | | |
| 2023/0109352 A1 * | 4/2023 | Wang | .................. | H04L 9/3073 |
| | | | | 713/153 |
| 2024/0297778 A1 | 9/2024 | Kim et al. | | |

FOREIGN PATENT DOCUMENTS

CN　　　　116975886 A　　10/2023

OTHER PUBLICATIONS

Office Action dated Dec. 1, 2025, issued in U.S. Appl. No. 18/820,782 (18 pages).

* cited by examiner

*Primary Examiner* — Maung T Lwin

(74) *Attorney, Agent, or Firm* — WHDA, LLP

(57)　　　　　　ABSTRACT

According to the present disclosure, a query information processing method of a database performed on a computing device includes: identifying query information requested from a client; acquiring initial search result data from a fully homomorphic encrypted database in response to the query information; performing a finite extension field-based grouping operation in response to the initial search result data; and providing the grouping-operated search result data to the client.

9 Claims, 5 Drawing Sheets

FIG. 4

Result

| | 0 | 🔒 [1, 0, 0], [0, 0, 0], [3, 0, 0]] |
| | 1 | 🔒 [4, 0, 0], [5, 0], [0, 0, 0]] |
| | 2 | 🔒 [0, 0, 0], [8, 0, 0], [0, 0, 0]] |
| | 3 | 🔒 [1, 0, 0], [2, 0, 0], [3, 0, 0]] |
| | 4 | 🔒 [0, 0, 0], [0, 0, 0], [6, 0, 0]] |

* [1, 0, 0], [1, 0, 0], [1, 0, 0]]
* [0, 1, 0], [0, 1, 0], [0, 1, 0]]
* [0, 0, 1], [0, 0, 1], [0, 0, 1]]
* [1, 0, 0], [1, 0, 0], [1, 0, 0]]
* [0, 1, 0], [0, 1, 0], [0, 1, 0]]

Result

| | 0 | 🔒 [1, 0, 0], [0, 0, 0], [3, 0, 0]] |
| | 1 | 🔒 [0, 4, 0], [0, 5, 0], [0, 0, 0]] |
| | 2 | 🔒 [0, 0, 0], [0, 0, 8], [0, 0, 0]] |
| | 3 | 🔒 [1, 0, 0], [2, 0, 0], [3, 0, 0]] |
| | 4 | 🔒 [0, 0, 0], [0, 0, 0], [0, 6, 0]] |

300

QUERY INFORMATION PROCESSING METHOD USING FULLY HOMOMORPHIC ENCRYPTED DATABASE WITH FIELD EXPANSION AND COMPUTING DEVICE FOR PERFORMING THE SAME

BACKGROUND

1. Field

The present disclosure relates to a computing device for processing homomorphic encryption and an operating method thereof, and more particularly, to a query information processing method using a fully homomorphic encrypted database.

2. Description of Related Art

Encryption systems such as Rivest, Shamir, and Adleman (RSA), elliptic curve cryptography (ECC), and advanced encryption standard (AES) requires a process of decrypting a ciphertext into plaintext in order to perform operation processing on the ciphertext, and there is a possibility that information may be leaked during the decryption process.

A homomorphic encryption technology devised to solve this problem uses mathematical characteristics called homomorphic operation to enable combination and operation processing on encrypted data, thereby preventing information leakage during the decryption process. In other words, the homomorphic encryption allows arbitrary operations on the ciphertexts to directly perform operations on the encrypted data without a separate decryption process, thereby improving the stability of the messages.

Usually, the plaintext and ciphertext of the fully homomorphic encryption are composed in the form of polynomial ring, and methods of improving an operation speed by enabling the multiple data to be stored in one ciphertext to perform a single instruction multiple data (SIMD) operation and a parallel operation on multiple data are being proposed. In particular, the SIMD is a method of packing data within specifications defined by ciphertext generation parameters and mainly padding the remaining space with 0, and libraries known as HElib, SEAL, and HEAAN PALISADE implement fully homomorphic encryption.

Recently, along with the development of such homomorphic encryption technology, the fully homomorphic encrypted database that hold sensitive data are being used in various fields. However, due to the need to fundamentally protect sensitive information such as personal information, personal information protection protocols known as private database query (PQD), private information retrieval (PIR), etc., are being developed as recommended elements.

However, in developing the homomorphic encrypted database including the personal information protection protocols, etc., there are problems in that the number of ciphertexts increases significantly, the amount of data and computations transmitted and received increases, and the computational speed delay occurs when using the existing method of using the homomorphic encrypted database as it is.

For example, when a client requests to execute the query on the fully homomorphic encrypted database, the query result values are also all encrypted, so it is impossible to distinguish between query hit and miss. As a result, there is a problem in that ciphertexts corresponding to the total number of data in the database should be generated and transmitted to the client as a query response.

As a result, when these existing methods are maintained, the number of encrypted messages to be processed increases significantly according to the protocol development, thereby causing problems such as data processing speed delay, server transmission delay, and network load.

SUMMARY

The present disclosure provides a query information processing method capable of reducing the amount of processing and preventing processing delay while maintaining a personal information protection protocol of a fully homomorphic encrypted database by reducing the number of ciphertexts provided as query search results using field expansion of a polynomial ring, and a computing device for performing the same.

According to an aspect of the present disclosure, a query information processing method of a database performed on a computing device includes: identifying query information requested from a client; acquiring initial search result data from a fully homomorphic encrypted database in response to the query information; performing a finite extension field-based grouping operation in response to the initial search result data; and providing the grouping-operated search result data to the client.

According to another aspect of the present disclosure, a computing device includes: a processor; and a memory communicating with the processor, in which the memory stores instructions that cause the processor to perform operations, and the operations include: an operation of identifying query information requested from a client; an operation of acquiring initial search result data from a fully homomorphic encrypted database in response to the query information; an operation of performing a finite extension field-based grouping operation in response to the initial search result data; and an operation of providing the grouping-operated search result data to the client.

According to still another aspect of the present disclosure for achieving the above-described object, a computer program stored in a computer-readable recording medium may include a program code for executing the above-described operation method.

BRIEF DESCRIPTION OF DRAWINGS

FIGS. 3 to 5 are diagrams for describing an example of a finite extension field-based grouping operation according to an embodiment of the present disclosure.

DETAILED DESCRIPTION

The following description illustrates only a principle of the present disclosure. Therefore, those skilled in the art may implement the principle of the present disclosure and invent various apparatuses included in the spirit and scope of the present disclosure although not clearly described or illustrated in the present specification. In addition, it is to be understood that all conditional terms and embodiments mentioned in the present specification are obviously intended only to allow those skilled in the art to understand a concept of the present disclosure in principle, and the present disclosure is not limited to embodiments and states particularly mentioned as such.

The abovementioned objects, features, and advantages will become more obvious from the following detailed description associated with the accompanying drawings. Therefore, those skilled in the art to which the present disclosure pertains may easily practice a technical idea of the present disclosure.

Further, in describing the present disclosure, when it is decided that a detailed description of the well-known technology associated with the present disclosure may unnecessarily make the gist of the present disclosure unclear, it will be omitted.

Various embodiments of the present disclosure will be described with reference to the accompanying drawings.

Figure 1:
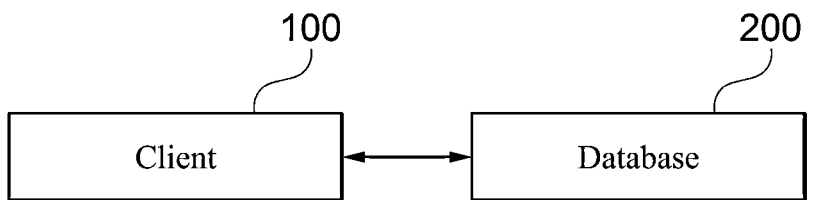
FIG. 1 is a block diagram for schematically describing a system according to an embodiment of the present disclosure.

FIG. 1 is a block diagram schematically illustrating an overall system according to an embodiment of the present disclosure.

Referring to FIG. 1, a system according to an embodiment of the present disclosure may be configured as a system that collects search result data corresponding to a query of a client 100 from a homomorphic encrypted database stored on a database 200, and provides the search result data through the client 100.

To this end, the database 200 may be a server that stores and manages one or more data built in advance to provide data to the client 100 in a fully homomorphic encrypted form, and an example thereof may include a data center, a database management system server, a storage server, etc.

The system of the present disclosure configured in this way may be configured as a system that connects the client 100 device and the database 200 device as individual computing devices, or may be installed and executed in a service form on the same server or computing device, respectively. In another embodiment of the present disclosure, each computing device may be executed as a virtual machine in a cloud computing environment.

In this system configuration, when query information requested from client 100 is identified, the database 200 may acquire initial search result data from a fully homomorphic encrypted database in response to the query information, and perform an operation of providing the grouping-operated search result data to the client 100 by performing a finite extension field-based grouping operation in response to the initial search result data.

By this finite extension field-based grouping operation process, it is possible to reduce the maximum number of ciphertexts provided as query search results. Accordingly, a specific data processing process using the embodiment of the present disclosure will be described in detail with reference to FIG. 2.

Figure 2:
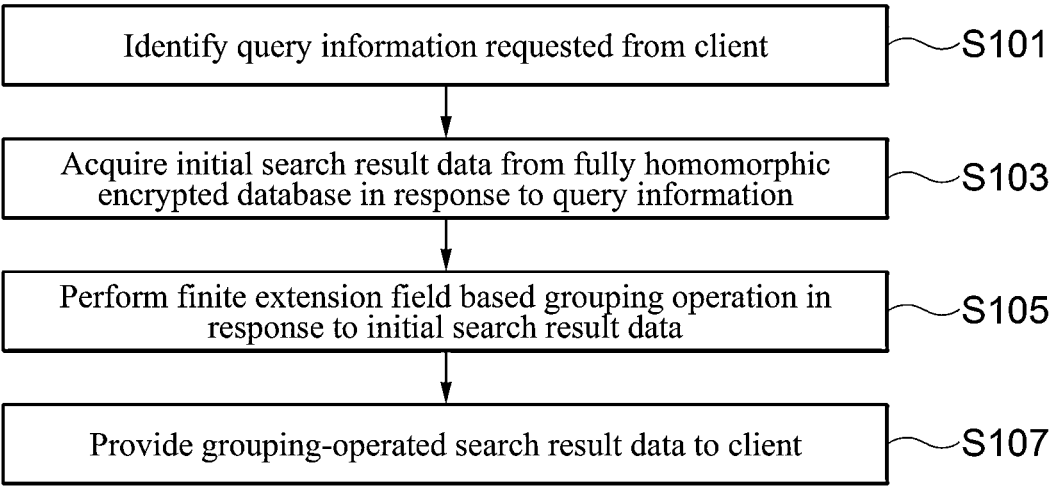
FIG. 2 is a flow diagram for describing an operation method of a computing device according to an embodiment of the present disclosure.

FIG. 2 is a flow diagram for describing an operation method of a computing device according to an embodiment of the present disclosure.

Referring to FIG. 2, a computing device according to an embodiment of the present disclosure may perform an operation of the database 200 that processes a query information-based request from the client 100 and provides search result data, and thus, the operation of the database 200 will be mainly described.

More specifically, first, the database 200 identifies the query information requested from the client 100 (S101).

More specifically, the query information may include a data search request corresponding to a specific query condition from a storage table of a database that fully homomorphically encrypts a structured database. This query condition may be in the form of a conditional statement configured for a fully homomorphic encrypted database, and may be used to index ciphertexts having a specific value by targeting a column or a row.

The database 200 acquires the initial search result data from the fully homomorphic encrypted database in response to the query information (S103).

Here, the initial search result data may be indexed and acquired in the general manner described above, and may include all search result data indexed according to the query condition of the query information in the fully homomorphic encrypted database. In this case, as described above, the maximum number of search results may eventually include the number of all fully homomorphically encrypted data stored in the database 200.

Thereafter, the database 200 performs a finite extension field-based grouping operation in response to the initial search result data (S105), so the number of search result data may be reduced by the grouping operation, and the grouping-operated search result data is provided to the client 100 (S107), so the transmission amount of query results may be reduced and the system or network load may be reduced.

More specifically, for example, the fully homomorphic encrypted plaintext and ciphertext stored in the database 200 are configured in the form of a polynomial ring, and the number of data that may be stored in one ciphertext may be pre-designated as n according to the highest order of the polynomial ring determined by a ciphertext parameter setting value.

In the case of the conventional method, when the fully homomorphic encryption with n designated in this way is performed on a structured database with rows R and columns C, the technologies described as the related art described above are typically processed in two methods.

The first method is a method of generating and storing each data row of the structured database as one ciphertext, and the total number of ciphertexts may be generated as $R*\lceil c/n \rceil$.

In addition, the second method is a method of generating ciphertexts for each data column of the structured database, and the total number of ciphertexts may be generated as $C*\lceil R/n \rceil$.

However, the plaintext of the fully homomorphic encrypted database 200 according to the embodiment of the present disclosure may be pre-configured to further include an integer array of a first order size expanded for the finite extension field-based grouping operation in a topological space of each plaintext of the fully homomorphic encrypted data.

The integer array of the first order size may be inserted as an extension field of the plaintext constituting the ciphertext, and may function as one additional data slot. As an expanded data slot is added as a row or column, a parallel addition operation between each polynomial of the search result data becomes possible, and furthermore, a data rotation operation using a multiplication operation becomes possible. Therefore, a result of reducing the total number of ciphertexts of the search result data may be derived through each operation process.

That is, by using the finite extension field-based grouping operation according to an embodiment of the present disclosure, the maximum number of ciphertexts generated as $R*\lceil C/n \rceil$ or $C*\lceil R/n \rceil$ in the past, may be reduced by up to 1/o in inverse proportion to a first order size o, thereby reducing the size of the amount of data to be transmitted and received, the bandwidth consumed, etc.

The integer array of the first order size may be used as a means for grouping at least a portion of the initial search result data corresponding to the first order size by performing a polynomial-to-polynomial parallel sum operation using the integer array of the first order size.

In addition, the integer array of the first order size may be used as a means for grouping at least a portion of the initial search result data corresponding to the first order size by performing a rotation operation of a polynomial array using the integer array of the first order size.

Accordingly, the maximum number of grouping-operated search result data is processed to be reduced compared to the maximum number of initial search result data according to the first order size.

Hereinafter, the principle of the grouping operation by the finite extension field will be described in more detail.

First, the parameters of the fully homomorphic encrypted data stored in the database 200 include a plaintext modulus p and a cyclotomic polynomial order m, and thus, the order n of the polynomial ring may be derived. Here, m may be determined by dividing a value of the Euler's Totient Function (phi (m)) by the multiplicative order of modulo (o) of p with respect to m. In a fully homomorphic encrypted library commonly known as HElib, the plaintext is expressed as an integer array of size n, and the number of data that can be stored in one plaintext and ciphertext may be designated as a maximum of n.

For example, as in the Mathematical Expression 1 below, when p=7 and m=300, phi (m) is calculated as 80 and o is calculated as 4, and as a result, n=20. Therefore, it can be seen that 20 pieces of data may be stored in one ciphertext. In this case, the plaintext of the fully homomorphic encrypted data may be represented as an array of size 20.

[Mathematical Expression 1]

$$p = 7, m = 300$$
$$a + bx + cx^2 + \ \dots \ + dx^{19} \Rightarrow [a, b, c, \dots , d]$$

Here, the database 200 according to the embodiment of the present disclosure may expand the topological space of the plaintext from F_p to a maximum F_po by additionally applying the finite extension field to the database. Referring to the example of Mathematical Expression 2 below, it can be seen that, by using this extension field, each data of the existing array may be expanded from one integer to an integer array of size o. Accordingly, the number of data that can be stored in one ciphertext increases to n*o. For example, an expanded array slot may be padded with a value of 0, and the addition and multiplication operations between search results due to the extension of the corresponding space become possible.

[Mathematical Expression 1]

$$F_p \ \Rightarrow \ F_{p^o}$$
$$[x_1, x_2, \dots , x_n] \ \ \ \ [[x_1, \dots , x_o], [x_{o+1}, \dots , x_{2o}], \dots , [x_{(n-1)o+1}, \dots , x_{no}]]$$

The database 200 according to an embodiment of the present disclosure may perform the addition and multiplication operations for grouping by using such finite extension field. In this way, the homomorphic addition and multiplication for the expanded ciphertext may be processed by parallel operations between polynomials of one order o for each data slot.

The addition and multiplication may be exemplified by the following Mathematical Expressions, and in each example, each polynomial may be represented as an array of coefficients.

First, the following Mathematical Expression 3 exemplifies a homomorphic addition method in an expanded state.

[Mathematical Expression 3]

$$\frac{[[x_1, \dots , x_o], [x_{o+1}, \dots , x_{2o}], \dots , [x_{(n-1)o+1}, \dots , x_{no}]] + }{[[x_1 + y_1, \dots , x_o + y_o], [\dots , x_{2o} + y_{2o}], \dots , [\dots , x_{no} + y_{no}]]}$$

The following Mathematical Expression 4 exemplifies a homomorphic multiplication method in the expanded state.

[Mathematical Expression 4]

$$\frac{* \ \frac{[[a, b, c, 0, \dots , 0], \dots ]}{[[d, e, f, 0, \dots , 0], \dots ]} \leftrightarrow (a + bx + cx^2)(d + ex + fx^2)}{[[ad, ae + bd, af + cd + be, bf + ce, cf, 0, \dots , 0], \dots ]}$$

In addition, referring to the following Mathematical Expression 5, it can be seen that the rotation effect of the array may be induced through monomial multiplication in the expanded state. That is, if a monomial of order d and coefficient 1 is multiplied by each data slot, it can be seen that the effect of rotating the data of the polynomial array to the right by d may be induced.

Accordingly, the rotation operation of the polynomial array described above may be exemplified as the multiplication operation that multiplies the initial search result data, in which the integer array of the first order size o is expanded, by the monomial of the preset second order d and first coefficient 1.

[Mathematical Expression 5]

$$\frac{* \ \frac{[[a, b, c, 0, \dots , 0], \dots ]}{[[0, 0, 0, 1, \dots , 0], \dots ]} \leftrightarrow (a + bx + cx^2) * x^3}{[[0, 0, 0, a, b, c, 0, \dots , 0], \dots ]}$$

As a result, it can be confirmed that the number of ciphertexts of the search result data derived as the query result of the fully homomorphic encrypted database may be reduced through the operation between these finite extension fields.

That is, when the number of columns of the existing search data is x, the existing database should transmit the entire database or $x * \lceil R/n \rceil$ ciphertexts. However, according to the embodiment of the present disclosure, there is an effect of reducing the number of ciphertexts by 1/o in inverse proportion to the first order size o, so that there is an effect of reducing the communication volume between the client 100 and the database 200 according to the embodiment of the present disclosure.

Figure 3:
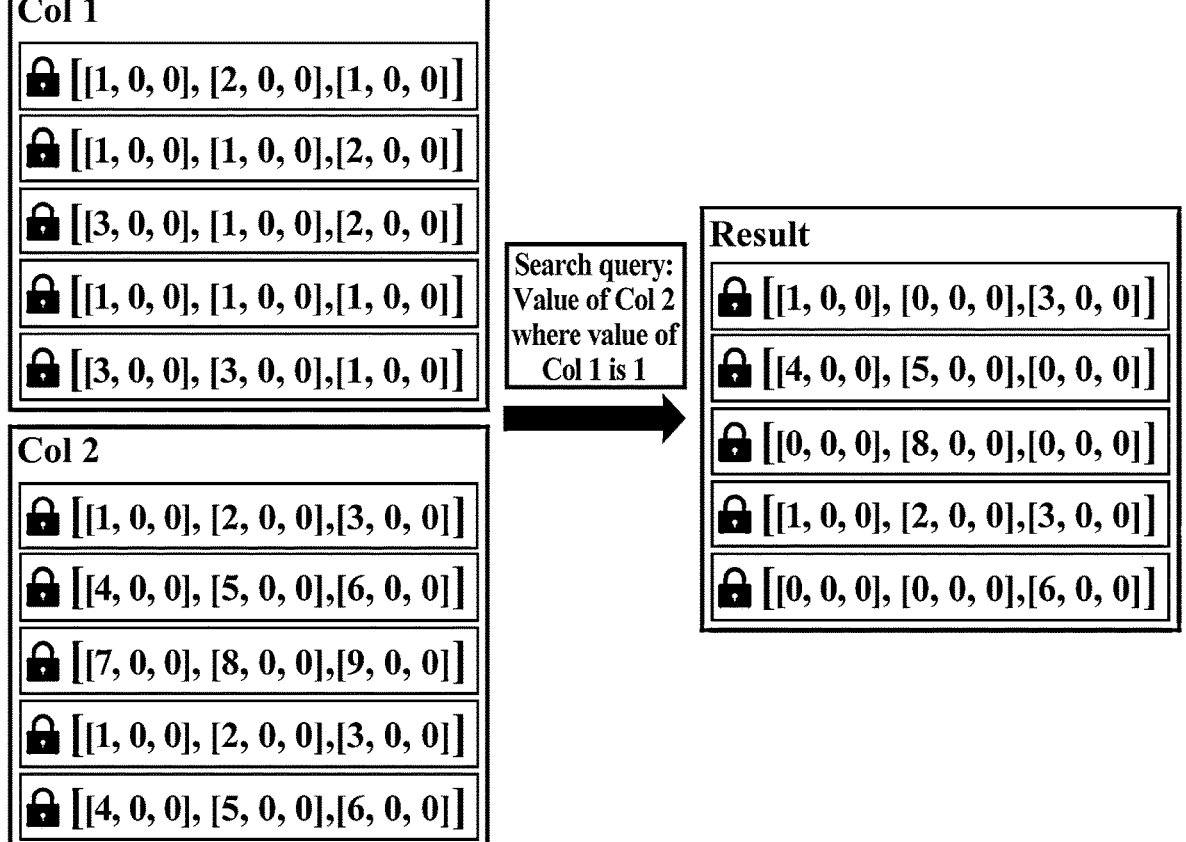
Figure 5:
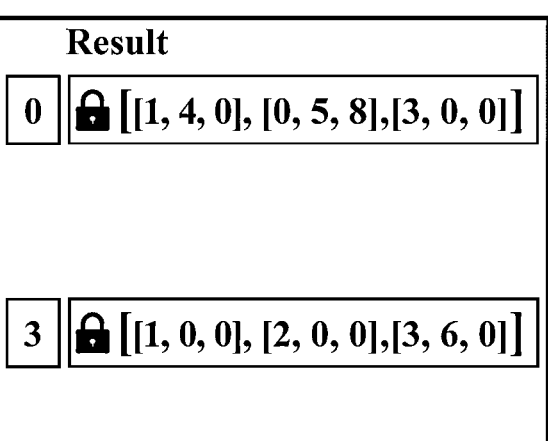

FIGS. 3 to 5 are diagrams for describing an example of a finite extension field-based grouping operation according to an embodiment of the present disclosure.

Referring to FIGS. 3 to 5, in the case where the search result N=5, the first order size o=3, and the plaintext size n=3, a process of sorting numbers of each ciphertext in the search result, multiplying a monomial of order [i % o] and coefficient 1 by each ciphertext i, and then merging into one ciphertext by performing an addition-based grouping operation for each o ciphertext may be described.

First, referring to FIG. 3, the database 200 acquires the initial search result data from the fully homomorphic encrypted database.

For example, in the database 200, a value of Col2, where a value of Col is 1, may be identified as an index condition from the query information, and N=5 search results may be confirmed as the initial search result data corresponding thereto.

In addition, referring to the left side of FIG. 4, the database 200 may sort each ciphertext and assign numbers. For example, as illustrated in FIG. 4, numbers 0, 1, 2, 3, and 4 each may be assigned in order.

In addition, referring to the right side of FIG. 4, the database 200 may perform a rotation operation for grouping corresponding to ciphertexts. This may be processed by performing the multiplication of the monomial of order [i % o] and coefficient of 1 by each ciphertext i assigned according to the number, so the search result may be transformed into a data array rotated by each order.

Finally, referring to FIG. 5, it can be confirmed that each ciphertext is merged into one ciphertext by performing an addition-based grouping operation for every o=3 ciphertexts. That is, as five data are finally designated as two ciphertexts, the search result may be confirmed even if only two ciphertexts configured as in FIG. 5 are transmitted to the client 100.

The client 100 may receive two ciphertexts and perform the processing of the database 200 in reverse to restore the original search result. To facilitate the restoration, in transmitting the search results to the client 100, the database 200 may transmit the search results to the client 100 by further adding signaling data indicating that the search results are data grouped by the finite extension field.

Figure 6:
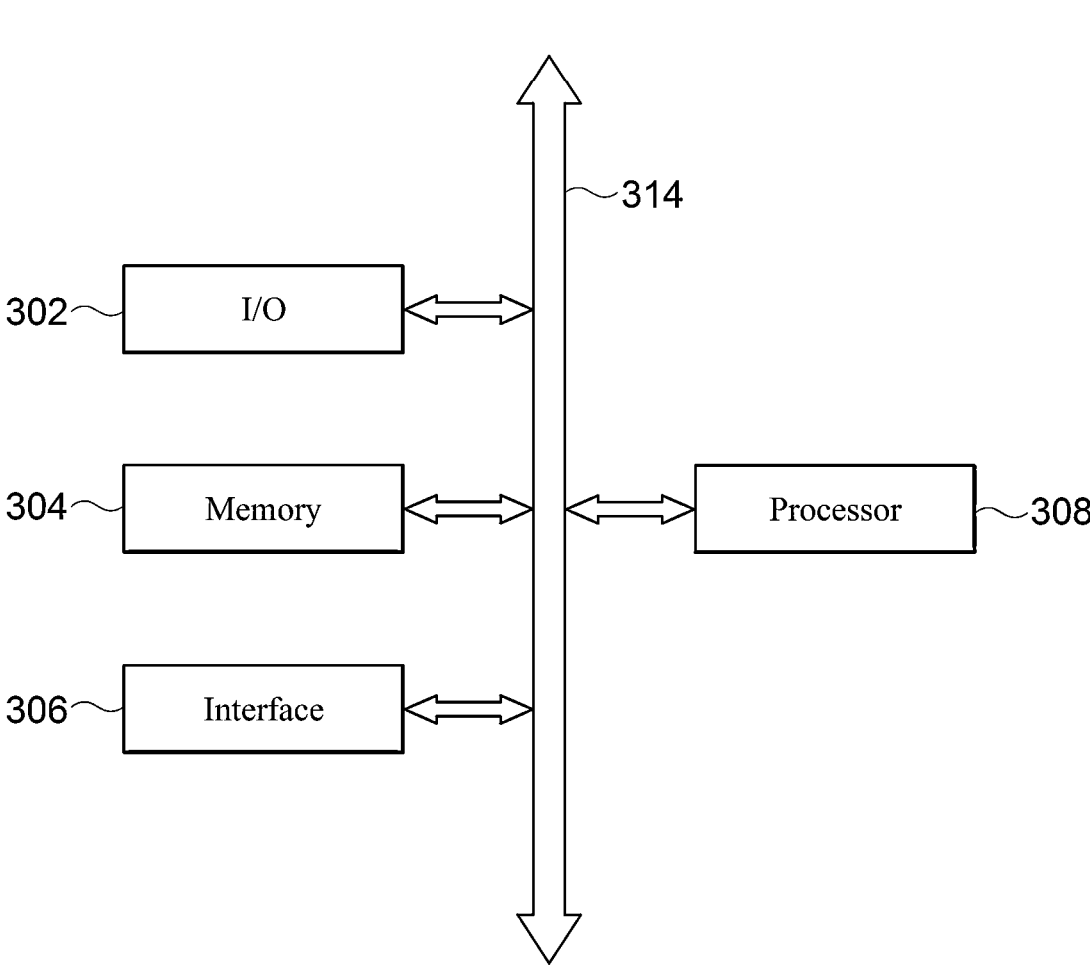
FIG. 6 is a block diagram illustrating a configuration of a computing device according to an embodiment of the present disclosure.

FIG. 6 is a block diagram illustrating a configuration of a computing device in accordance with an embodiment.

Referring to FIG. 6, the client 100 and the database 200 may be implemented as a computing device 300. At least one of each module constituting the computing device 300 according to an embodiment of the present disclosure is implemented on a general-purpose computing processor and thus may include a processor 308, an input/output I/O 302, a memory 340, an interface 306, and a bus 314. The processor 308, the input/output device 302, the memory 304, and/or the interface 306 may be coupled to each other via the bus 314. The bus 314 corresponds to a path through which data moves.

Specifically, the processor 308 may include at least one of a central processing unit (CPU), a micro processor unit (MPU), a micro controller unit (MCU), a graphic processing unit (GPU), a microprocessor, a digital signal processor, a microcontroller, an application processor (AP), and logic devices capable of performing functions similar thereto.

The input/output device 302 may include at least one of a keypad, a keyboard, a touchscreen, and a display device. The memory device 304 may store data and/or programs, etc.

The interface 306 may perform a function of transmitting data to or receiving data from a communication network. The interface 306 may be wired or wireless. For example, the interface 306 may include an antenna or a wired/wireless transceiver, etc. The memory 304 may further include a high-speed DRAM and/or SRAM, etc., as a volatile operating memory for improving the operation of the processor 308 and protecting personal information.

In addition, the memory 304 stores programming and data configurations that provide the functions of some or all of the modules described herein. For example, it may include logic to perform selected aspects of the learning method described above.

A program or application is loaded as a set of instructions that includes each step of performing the acquisition method described above stored in the memory 304, and causes the processor to perform each step.

Furthermore, various exemplary embodiments described herein may be implemented in computer-readable recording medium using, for example, software, hardware, or a combination thereof.

According to a hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for executing other functions. In some cases, embodiments described herein may be implemented as a control module itself.

According to a software implementation, embodiments such as procedures and functions described herein may be implemented as separate software modules. Each of the software modules may execute one or more functions and operations described herein. A software code may be implemented as a software application written in a suitable programming language. The software code may be stored in a memory module and executed by a control module.

According to an embodiment of the present disclosure, by performing the finite extension field-based grouping operation of the first order size corresponding to the initial search result data of the fully homomorphic encrypted database, it is possible to reduce the maximum number of ciphertexts provided as the query search results.

Accordingly, according to the present disclosure, by reducing the number of ciphertexts provided as the query search results using the field expansion of the polynomial ring, it is possible to reduce the processing amount and preventing the processing delay while maintaining the personal information protection protocol of the fully homomorphic encrypted database and support the safe operation of the encrypted database in a state where the computation amount and network load are reduced.

The spirit of the present disclosure has been described only by way of example hereinabove, and the present disclosure may be variously modified, altered, and substituted by those skilled in the art to which the present disclosure pertains without departing from essential features of the present disclosure.

Accordingly, embodiments disclosed in the disclosure and the accompanying drawings are provided in order to describe the technical spirit of the disclosure rather than limiting the technical spirit of the disclosure, and the scope of the disclosure is not limited by these embodiments and the accompanying drawings. The scope of the disclosure should be interpreted by the following claims, and it should be interpreted that all spirits equivalent to the following claims fall within the scope of the disclosure.

What is claimed is:

1. A query information processing method of a database performed on a computing device, comprising:

identifying query information requested from a client;

acquiring initial search result data from a fully homomor-
phic encrypted database in response to the query infor-
mation;

performing a finite extension field-based grouping opera-
tion in response to the initial search result data, wherein the fully homomorphic encrypted database is
pre-configured to further include an integer array of
a first order size expanded for the finite extension
field-based grouping operation in a topological space
of each plaintext of the fully homomorphic
encrypted data, wherein the performing of the grouping operation
includes grouping at least a portion of the initial
search result data corresponding to the first order size
by performing a rotation operation of a polynomial
array using the integer array of the first order size;
and providing the grouping-operated search result data to the
client.

2. The query information processing method of claim 1,
wherein the performing of the grouping operation includes
grouping at least a portion of the initial search result data
corresponding to the first order size by performing a poly-
nomial-to-polynomial parallel sum operation using the inte-
ger array of the first order size.

3. The query information processing method of claim 1,
wherein the rotation operation of the polynomial array is
performed by a multiplication operation in which the initial
search result data, in which the integer array of the first order
size is expanded, is multiplied by a monomial of a preset
second order and first coefficient.

4. The query information processing method of claim 1,
wherein the maximum number of grouping-operated search
result data is reduced compared to the maximum number of
initial search result data according to the first order size.

5. A computing device, comprising:

a processor; and a memory communicating with the processor, wherein the memory stores instructions that cause the
processor to perform operations, and the operations
include:

an operation of identifying query information requested
from a client;

an operation of acquiring initial search result data from a
fully homomorphic encrypted database in response to
the query information;

an operation of performing a finite extension field-based
grouping operation in response to the initial search
result data, wherein the fully homomorphic encrypted database is
pre-configured to further include an integer array of a first order size expanded for the finite extension
field-based grouping operation in a topological space
of each plaintext of the fully homomorphic
encrypted data, wherein the operation of performing the grouping
operation includes an operation of grouping at least
a portion of the initial search result data correspond-
ing to the first order size by performing a rotation
operation of a polynomial array using the integer
array of the first order size; and an operation of providing the grouping-operated search
result data to the client.

6. The computing device of claim 5, wherein the operation
of performing the grouping operation includes an operation
of grouping at least a portion of the initial search result data
corresponding to the first order size by performing a poly-
nomial-to-polynomial parallel sum operation using the inte-
ger array of the first order size.

7. The computing device of claim 5, wherein the rotation
operation of the polynomial array is performed by a multi-
plication operation in which the initial search result data, in
which the integer array of the first order size is expanded, is
multiplied by a monomial of a preset second order and first
coefficient.

8. The computing device of claim 5, wherein the maxi-
mum number of grouping-operated search result data is
reduced compared to the maximum number of initial search
result data according to the first order size.

9. A computer-readable recording medium storing a com-
puter program for causing a computing device to execute a
method, comprising:

identifying query information requested from a client;

acquiring initial search result data from a fully homomor-
phic encrypted database in response to the query infor-
mation;

performing a finite extension field-based grouping opera-
tion in response to the initial search result data, wherein the fully homomorphic encrypted database is
pre-configured to further include an integer array of
a first order size expanded for the finite extension
field-based grouping operation in a topological space
of each plaintext of the fully homomorphic
encrypted data, wherein the performing of the grouping operation
includes grouping at least a portion of the initial
search result data corresponding to the first order size
by performing a rotation operation of a polynomial
array using the integer array of the first order size;
and providing the grouping-operated search result
data to the client.

* * * * *